Patented Dec. 21, 1948

2,456,851

UNITED STATES PATENT OFFICE 2,456,851

ALKYLNICOTINIUM ARYLSULFONATE PESTICIDE

Charles F. Woodward, Abington, Donald H. Saunders, Oreland, and Raymond C. Provost, Jr., Washington, Pa., assignors to the United States of America as represented by the Secretary of Agriculture No Drawing. Application February 2, 1945, Serial No. 575,830

9 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

Our invention relates to new derivatives of nicotine, particularly alkylnicotinium arylsulfonates, and a process for their preparation. These derivatives are valuable due to their surface active and non-volatile properties. They are desirable ingredients in those types of pesticidal compositions where such properties are needed and are in themselves effective pesticidal agents.

The alkylnicotinium arylsulfonates of this invention may be represented by the general formula B(RX)$_n$, in which B represents nicotine, R represents a monovalent alkyl group, X represents an aromatic monosulfonate, in particular the group aryl—SO$_3$—, and $n$ is an integer not greater than 2, R and X of each RX grouping being linked to the same nitrogen atom of the nicotine nucleus. R may be a saturated alkyl group containing one or more carbon atoms, such as methyl, ethyl, butyl, octyl, lauryl, hexadecyl, and octadecyl; an unsaturated alkyl group, such as allyl and methallyl; a substituted unsaturated alkyl group, such as beta-chlorallyl; a monovalent organic radical in which the carbon chain is interrupted by oxygen atoms, such as the radical obtained by removal of the hydrogen atom of the alcohol group of butyl carbitol, diethyleneglycol, or triethyleneglycol.

In the general formula given above, X represents the group obtained by the removal of the acidic hydrogen atom from a monosulfonated aromatic hydrocarbon and is exemplified by benzene sulfonate, toluene sulfonate, naphthalene sulfonate, and diphenyl sulfonate. The aromatic nucleus may contain, in addition to the sulfonate group, substituting groups, such as halogen, alkyl, alkoxy, nitro, and acyloxy radicals.

The alkylnicotinium arylsulfonates of this invention are prepared by the reaction of nicotine with an alkyl ester of an aromatic monosulfonic acid. For example, the reaction of ($n$)-dodecyl p-toluene sulfonate with nicotine in equimolecular proportions yields ($n$)-dodecyl nicotinium p-toluene sulfonate.

The formation of alkylnicotinium arylsulfonates of the type B(RX)$_2$ is exemplified by the formation of dimethyl nicotinium di-p-toluene sulfonate from the reaction of nicotine with methyl p-toluene sulfonate in the molecular ratio of 1 to 2, respectively.

The following examples will serve to illustrate further our invention:

Example 1

A mixture consisting of 37.2 g. methyl p-toluene sulfonate, 16.2 g. nicotine, and 35 cc. benzene was heated under reflux for one-half hour. A viscous oil separated which crystallized after distilling off approximately 15 cc. of benzene. The resulting crude crystalline residue was extracted with boiling petroleum ether.

The crystals were further purified by recrystallizing from a mixed solvent consisting of dry acetone and methanol. The purified colorless compound was extremely hygroscopic, very soluble in water, and melted at 148°–150° C. The analytical content of sulfur corresponded with the theoretical amount for dimethyl nicotinium di(p-toluene sulfonate).

Example 2

A mixture consisting of 25 g. $n$-dodecyl p-toluenesulfonate, 11.9 g. of nicotine, and 25 cc. of benzene was reacted and purified by extracting with petroleum ether in the same manner as described in Example 1.

The viscous residue was freed of solvent under vacuum and the final product was a viscous water-soluble liquid. The analytical content of sulfur corresponded with that calculated for ($n$)-dodecyl nicotinium p-toluenesulfonate.

Example 3

A mixture consisting of 35 g. of n-octadecyl p-toluenesulfonate, 13.37 g. of nicotine and 55 cc. of benzene was heated under reflux in an oil bath maintained at 110° C. for 3.5 hours, 130° C. for 0.5 hour and 145° C. for 1.5 hours. The reaction product was purified and freed of solvent as in Example 2. The sulfur content of the compound corresponded to the calculated theoretical value for $n$-octadecyl nicotinium p-toluene sulfonate.

Example 4

A mixture consisting of 40 g. of diethylene glycol monobutylether-p-toluene sulfonate, 20.4 g. of nicotine, and 50 cc. of benzene was reacted and purified in the same way as described in Example 2. The sulfur content of the recovered compound corresponded to the calculated theoretical value for beta butoxy, beta (nicotinium p-toluene sulfonate)-diethyl ether.

Example 5

Thirty-four grams of beta-methallyl p-toluene sulfonate dissolved in 20 cc. of dry ethyl ether were mixed with 24.5 g. of nicotine dissolved in 30 cc. of dry ethyl ether and allowed to stand 24 hours. The ether solution was then decanted and the insoluble product extracted several times with boiling ethyl ether. Traces of solvent were removed under vacuum. The sulfur content of the compound corresponded to the calculated theoretical value for beta-methallyl nicotinium p-toluene sulfonate.

The alkylnicotinium arylsulfonates of this invention may be used as insecticides by applying them to the habitat of the insect or to a material which is liable to attack by the insect. They may be dissolved in a suitable solvent, such as water, acetone, kerosene, and so forth, and used as a spray, or mixed with some other form of carrier, such as clay, bentonite, diatomaceous earth, talc, and so forth.

Having thus described our invention, we claim:

1. An alkylnicotinium arylsulfonate represented by the general formula $B(RX)_n$, in which B represents nicotine, R represents a monovalent alkyl group, X represents the group aryl—$SO_3$—, and $n$ is an integer not greater than 2, R and X of each RX grouping being linked to the same nitrogen atom of the nicotine nucleus.

2. The alkylnicotinium arylsulfonate of claim 1, wherein $n$ is 1.

3. The alkylnicotinium arylsulfonate of claim 1, wherein $n$ is 2.

4. The alkylnicotinium arylsulfonate of claim 1, wherein the group aryl—$SO_3$— is p-toluene sulfonate.

5. (n)-Dodecyl nicotinium p-toluene sulfonate.

6. Dimethyl nicotinium di(p-toluene sulfonate).

7. Methallyl nicotinium p-toluene sulfonate.

8. A process comprising reacting nicotine with an alkyl ester of an aromatic monosulfonic acid, whereby a nicotinium salt is produced in which the alkyl group and the aromatic monosulfonic radical are both attached to the same nitrogen atom of the nicotine nucleus.

9. A pesticide comprising an alkylnicotinium arylsulfonate and a carrier therefor, said alkylnicotinium arylsulfonate having the general formula $B(RX)_n$, in which B represents nicotine, R represents a monvalent alkyl group, X represents the group aryl—$SO_3$—, and $n$ is an integer not greater than 2, R and X of each RX grouping being linked to the same nitrogen atom of the nicotine nucleus.

CHARLES F. WOODWARD.
DONALD H. SAUNDERS.
RAYMOND C. PROVOST, Jr.

REFERENCES CITED

The following references are of record in the file of this patent:

UNITED STATES PATENTS

| Number | Name | Date |
|---|---|---|
| 2,212,519 | Giesinger | Aug. 27, 1940 |
| 2,232,662 | Hockenyos | Feb. 18, 1941 |